US007689797B2

(12) United States Patent
Graves et al.

(10) Patent No.: US 7,689,797 B2
(45) Date of Patent: Mar. 30, 2010

(54) METHOD FOR AUTOMATICALLY CONFIGURING ADDITIONAL COMPONENT TO A STORAGE SUBSYSTEM

(75) Inventors: Jason J. Graves, Morrisville, NC (US); Kevan D. Holdaway, Hillsborough, NC (US); Nhu T. Nguyen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 11/846,576

(22) Filed: Aug. 29, 2007

(65) Prior Publication Data

US 2009/0063767 A1    Mar. 5, 2009

(51) Int. Cl.
 G06F 12/00    (2006.01)
(52) U.S. Cl. ...................................... 711/170
(58) Field of Classification Search ........................ None
 See application file for complete search history.

(56) References Cited

U.S. PATENT DOCUMENTS

| | | | |
|---|---|---|---|
| 5,751,967 A | 5/1998 | Raab et al. | |
| 6,263,387 B1 * | 7/2001 | Chrabaszcz | 710/302 |
| 6,978,379 B1 | 12/2005 | Goh et al. | |
| 6,990,545 B2 * | 1/2006 | Arimilli et al. | 710/302 |
| 7,150,037 B2 | 12/2006 | Wolf et al. | |
| 7,395,359 B2 * | 7/2008 | Reister | 710/8 |
| 2002/0103889 A1 | 8/2002 | Markson et al. | |
| 2004/0107272 A1 | 6/2004 | Manukyan | |
| 2004/0199696 A1 | 10/2004 | Chari et al. | |
| 2004/0215865 A1 * | 10/2004 | Arimilli et al. | 710/302 |
| 2005/0240727 A1 | 10/2005 | Shah et al. | |
| 2006/0064542 A1 * | 3/2006 | Goodman et al. | 711/114 |
| 2006/0085618 A1 | 4/2006 | Mimatsu et al. | |
| 2006/0140211 A1 | 6/2006 | Huang et al. | |
| 2006/0218326 A1 | 9/2006 | Tanaka | |

* cited by examiner

Primary Examiner—Hiep T Nguyen
(74) Attorney, Agent, or Firm—Dillon & Yudell LLP

(57) ABSTRACT

A method for automatically configuring a newly added component to a storage subsystem is disclosed. In response to a new component being connected to a storage subsystem, a determination is made whether or not the new component is a host computer or a disk drive. If the new component is a host computer, the new component is added to the storage subsystem as a host computer when the number of computer systems that can be supported by the storage subsystem has not yet been exceeded. If the new component is a disk drive, the new component is allocated to a pool of storage devices within the storage subsystem, wherein some of the pool of storage devices are held in reserve while some of the pool of storage devices are allocated to a host computer based on policy rules.

12 Claims, 2 Drawing Sheets

METHOD FOR AUTOMATICALLY CONFIGURING ADDITIONAL COMPONENT TO A STORAGE SUBSYSTEM

BACKGROUND OF THE INVENTION

1. Technical Field

The present invention relates to storage subsystems in general, and more particularly, to storage systems having multiple storage devices. Still more particularly, the present invention relates to a method for automatically configuring newly added components to a storage subsystem.

2. Description of Related Art

A storage subsystem is commonly provided to a data processing system for storing data to be utilized by the data processing system. For most storage subsystems, the storage capacity often needs to be expanded over a period of time. However, the process of storage capacity expansion typically requires extensive user interactions.

For example, during the addition of new disk drives in a storage system, a user must configure the new disk drives by first creating a storage pool that defines the redundant array independent disk (RAID) type. After a storage pool has been established, a storage volume can then be created, which determines the storage capacity that a host computer can access. The newly created storage volume can be mapped to the host computer as an expansion to an existing storage pool or as an addition to a host computer. All of the above-mentioned steps are required to be performed manually by the user.

Consequently, it would be desirable to provide an improved method for configuring newly added storage devices to a storage subsystem that requires minimal user interactions.

SUMMARY OF THE INVENTION

In accordance with a preferred embodiment of the present invention, in response to a new component being connected to a storage subsystem, a determination is made whether or not the new component is a host computer or a disk drive. If the new component is a host computer, the new component is added to the storage subsystem as a host computer when the number of computer systems that can be supported by the storage subsystem has not yet been exceeded. If the new component is a disk drive, the new component is allocated to a pool of storage devices within the storage subsystem, wherein some of the pool of storage devices are held in reserve while some of the pool of storage devices are allocated to a host computer based on policy rules.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
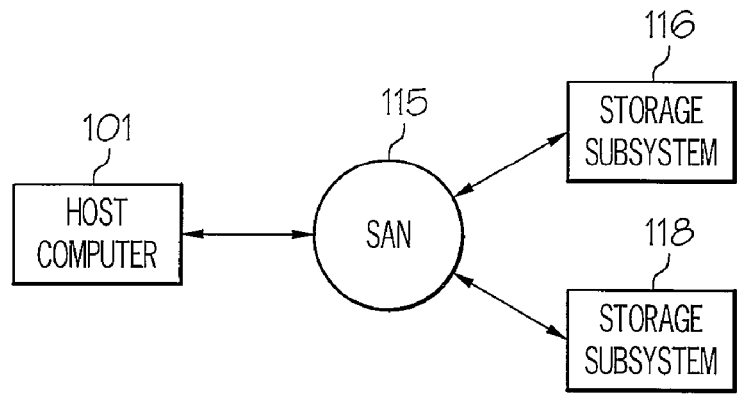
FIG. 1 is a block diagram of a computer having multiple storage subsystems, in accordance with a preferred embodiment of the present invention.

With reference now to the drawings, and in particular to FIG. 1, there is illustrated a block diagram of a computer having multiple storage subsystems, in accordance with a preferred embodiment of the present invention. As shown, a host computer 101 is coupled to storage subsystems 116 and 118 via a storage area network (SAN) 115. Host computer 101 may be a server or other similar data processing system.

Figure 2:
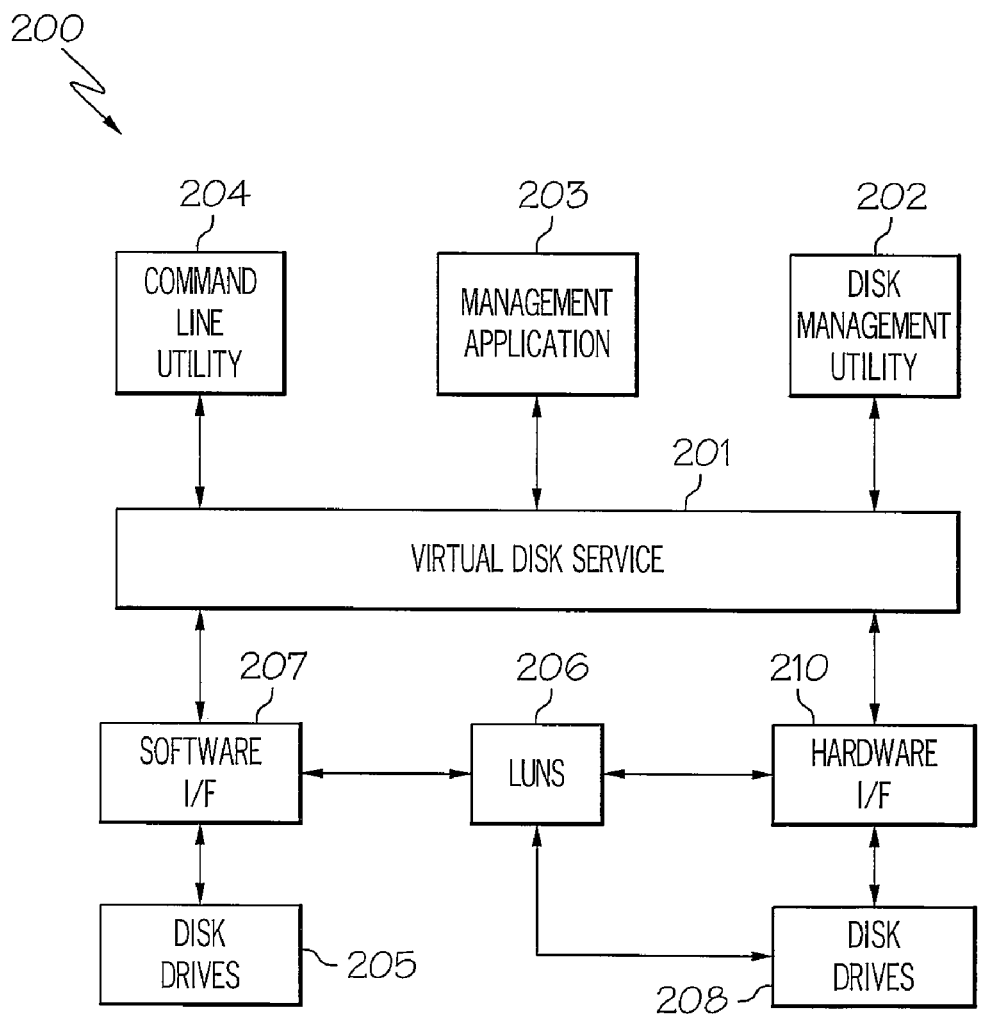
FIG. 2 is a block diagram of virtual disk service architecture within the storage system in FIG. 1, in accordance with a preferred embodiment of the present invention.

With reference now to FIG. 2, there is depicted a block diagram of virtual disk service (VDS) architecture within the storage subsystems in FIG. 1, in accordance with a preferred embodiment of the present invention. As shown, VDS architecture 200 includes disk drives 205 and 208 that are coupled to VDS 201 via software interface 207 and hardware interface 210. Each of logical unit numbers (LUNs) 206 is a unique identifier on a hardware interface such as small computer system interface (SCSI) or Fiber Channel.

VDS architecture 200 allows storage hardware vendors to write hardware specific code that can be translated into hardware interface 210. Disk management utility 202, management application 203 and command line interface utility 204 allow a SAN vendor to use application-programming interfaces (APIs) to build applications for managing SANs. Management application 203 may be used to build vendor specific applications. Command line utility program 204 uses sequences of commands to create, configure and manage LUNs 206 in redundant array of inexpensive disks (RAID) storage subsystems and storage subsystem objects such as disks, partitions and volumes.

In accordance with a preferred embodiment of the present invention, a RAID controller on a RAIDed switch provides a daemon (new service) that directly controls various storage controlling features within a storage subsystem. The daemon is active from system genesis; however, the daemon can be deactivated by a user. The daemon can generate, allocate and reduce/expand LUNs according to either a default policy or a custom policy that is provided by an end user on initial setup.

When new drives are added to a storage subsystem, such as storage subsystems 116 or 118 from FIG. 1, the daemon takes actions based on its policy. Examples of policies that can be used in a storage subsystem are depicted in Table I.

TABLE I

| Policy Name | Description |
|---|---|
| Allocate As discovered | A policy where available storage is allocated as new hosts are discovered. User input: |
| | Minimum Size LUN: Minimum size of LUN to allocate to host |

TABLE I-continued

| Policy Name | | Description |
|---|---|---|
| | Wait Period: | Maximum time to hold reserved storage before assigning to existing hosts |
| | Max Hosts: | Maximum number of hosts to support |
| | RAID Level: | RAID level for all hosts' LUNs |
| | Reserve Size: | Size of storage to reserve for allocation |
| Priority | A policy where a host (or hosts) is selected as having priority for storage allocations. User input: | |
| | Server: | Identifier for priority host(s) |
| | Max LUN: | Max size of LUN priority host can receive (can vary per host) |
| | Max Hosts: | Maximum number of hosts to support |
| | Priority RAID Level: | RAID level for priority host(s) |
| | RAID Level: | RAID level for all other hosts |
| | Reserve Size: | Size of storage to reserve for allocation |
| Performance | A policy where all hosts are assigned storage that maximizes use of storage in the overall system. User input: | |
| | Max Hosts: | Maximum number of hosts to support |
| | Reserve Size: | Size of storage to reserve for allocation |
| Reliability | A policy where all hosts are assigned storage that maximizes the reliability of the storage assigned to the host. User input: | |
| | Max Hosts: | Maximum number of hosts to support |
| | Reserve Size: | Size of storage to reserve for allocation |
| Static | A policy where a user defines the initial storage requirements of hosts to the system. User input: | |
| | Server: | Identifier for host |
| | LUN Size: | Size of initial LUN |
| | RAID Level: | RAID level of assigned LUN |
| | Addl. Host Support: | Indicator if more hosts are supported |
| | Reserve Size: | Size of storage to reserve for allocation |

When a new host computer is discovered by a controller, the policies define the behavior such that a user does not need to configure and assign storage for the new host computer. For the policies listed in Table I, the daemon can take actions after a new storage device and/or a new host computer have been discovered in the storage subsystem that meets the requirements for the policy. If, for example, the policy selected is Reliability when a new drive is added to the storage subsystem, it will automatically be added to the reserved storage. If the controller discovers a new host computer, the controller will create and allocate a LUN to the new host computer using an internal policy for the size of the LUN and RAID of the LUN that meets an accepted standard for reliability.

For all of the policies, when the maximum number of host computers has been reached (or additional host computers are not supported), the reserve is used in a separate fashion. The daemon looks at host activities and examines usage of allocated LUNs. When a host computer is near full usage of its LUN, the daemon allocates the reserved storage to the host computer by extending the size of the LUN. For the policies that have room for more host computers, the wait time is used to determine when reserved space is allocated to existing host computers. The daemon can also perform LUN trimming for host computers that are not actively using all of the storage space being assigned to them. Such frees space can then be deposited in the reserve and allocated to a different host computer.

Figure 3:
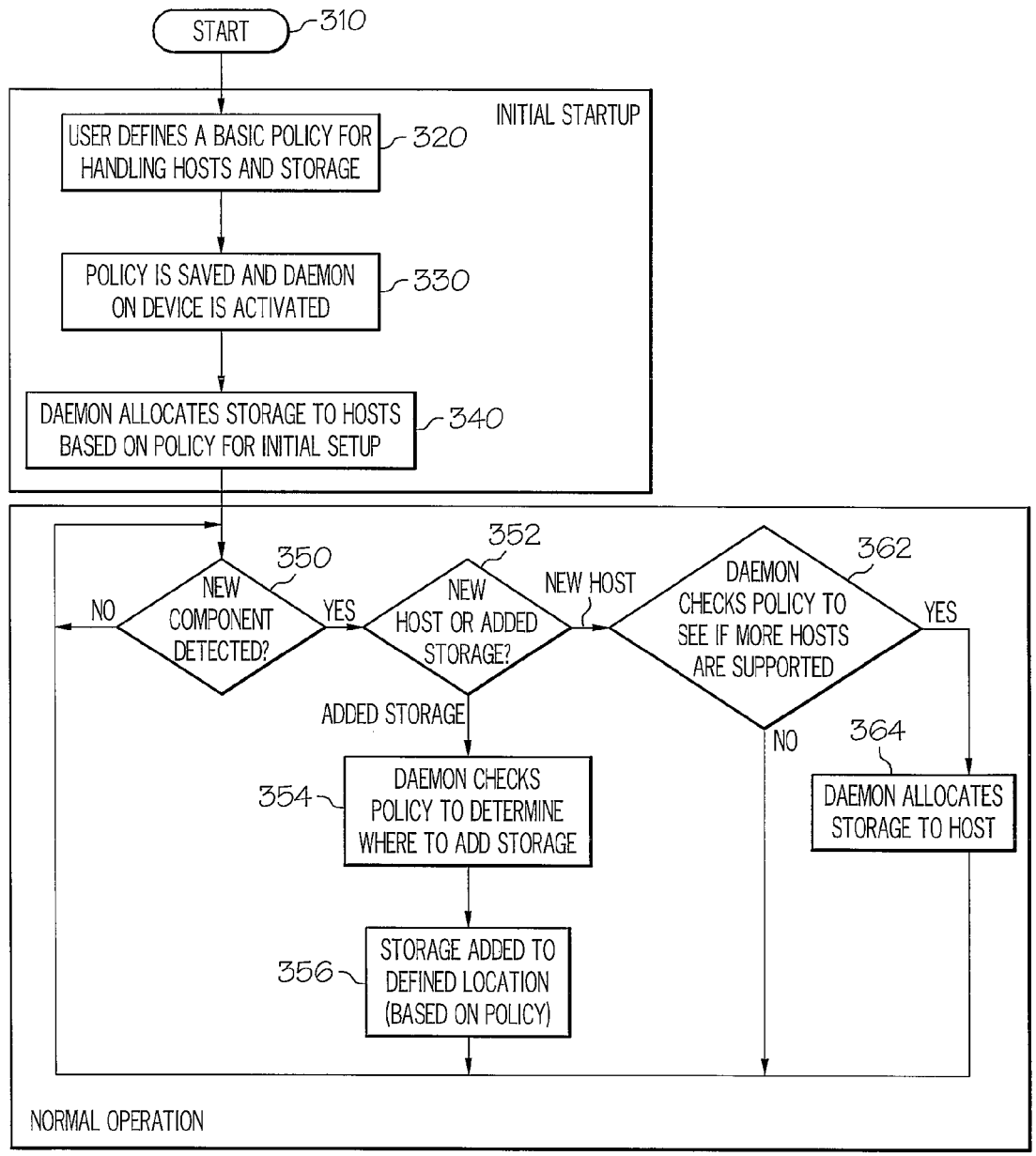
FIG. 3 is a high-level logic flow diagram of a method for automatically configuring newly added storage devices to the storage system from FIG. 1, in accordance with a preferred embodiment of the invention.

Referring now to FIG. 3, there is depicted a high-level logic flow diagram of a method for automatically configuring newly added storage devices to the storage system from FIG. 1, in accordance with a preferred embodiment of the invention. Starting at block 310, basic policies for handling host computers and storage devices are defined by a user, as shown in block 320. The policies are then saved, and a daemon is activated, as depicted in block 330. During the initial setup, the daemon allocates corresponding storage devices to each host computer based on the saved policies, as shown in block 340.

In response to the detection of an addition of a new component by the daemon, as depicted in block 350, a determination is made whether the new component is a new host computer or a new storage device, such as a disk drive, as shown in block 352. In the present embodiment, a controller where the daemon can execute has logically two separate paths between host computers and storage devices. Thus, the determination of whether the new component is a new host computer or a new storage device can be made by checking a new World Wide Name (WWN) or World Wide Node Name (WWNN) on each of the two paths. In a more generic embodiment, for an iSCSI storage network, iSCSI Qualified Names (IQNs) may be used to distinguish between a host computer and a storage device. The controller can determine a storage device from a host computer's perspective, but it will also see LUNs as the storage devices.

If the new component is a new storage device, the daemon checks the saved policy to determine the location at which the new storage device should be added, as depicted in block 354. Afterwards, the storage device is added to the defined location, as shown in block 356.

Otherwise, if the new component is a new host computer, the daemon checks the saved policy to determine if more host computers can be supported, as depicted in block 362. If more host computers can be supported, then the daemon allocates storage devices to the new host computer, as shown in block 364. The daemon can put the host computer in a queue for obtaining new storage device if there is no storage device available at the time. However, if more host computers cannot be supported, the process returns to block 350.

As has been described, the present invention provides an improved method for automatically configuring newly added storage devices to a storage subsystem.

While an illustrative embodiment of the present invention has been described in the context of a fully functional storage system, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of the types of media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for automatically configuring a newly added component to a storage subsystem, said method comprising:
   in response to a new component being connected to said storage subsystem, determining whether or not said new component is a host computer or a disk drive based on a signature of said new component;
   in a determination that said new component is a host computer, adding said new component to said storage subsystem as a host computer when a number of computer systems that can be supported by said storage subsystem has not been exceeded; and
   in a determination that said new component is a disk drive, allocating said new component to a pool of storage devices within said storage subsystem, wherein some of said pool of storage devices are held in reserve while some of said pool of storage devices are allocated to a host computer based on policy rules.

2. The method of claim 1, wherein said method further includes ignoring said host computer when the number of systems that can be supported by said storage subsystem has been exceeded.

3. The method of claim 1, wherein said adding further includes generating a logical unit number (LUN) and mapping said LUN to said host computer based on LUN RAID and capacity rules.

4. The method of claim 1, wherein said signature of said new component is a World Wide Name.

5. The method of claim 1, wherein said signature of said new component is a World Wide Node Name.

6. The method of claim 1, wherein said signature of said new component is an iSCSI Qualified Name.

7. A computer storage medium having a computer program product for automatically configuring a newly added component to a storage subsystem, said computer storage medium comprising:
   computer program code for, in response to a new component being connected to said storage subsystem, determining whether or not said new component is a host computer or a disk drive based on a signature of said new component;
   computer program code for, in a determination that said new component is a host computer, adding said new component to said storage subsystem as a host computer when a number of computer systems that can be supported by said storage subsystem has not been exceeded; and
   computer program code for, in a determination that said new component is a disk drive, allocating said new component to a pool of storage devices within said storage subsystem, wherein some of said pool of storage devices are held in reserve while some of said pool of storage devices are allocated to a host computer based on policy rules.

8. The computer storage medium of claim 7, wherein said computer storage medium further includes computer program code for ignoring said host computer when the number of systems that can be supported by said storage subsystem has been exceeded.

9. The computer storage medium of claim 7, wherein said computer program code for adding further includes computer program code for generating a logical unit number (LUN) and mapping said LUN to said host computer based on LUN RAID and capacity rules.

10. The computer storage medium of claim 7, wherein said signature of said new component is a World Wide Name.

11. The computer storage medium of claim 7, wherein said signature of said new component is a World Wide Node Name.

12. The computer storage medium of claim 7, wherein said signature of said new component is an iSCSI Qualified Name.

* * * * *